| United States Patent | [15] | 3,668,268 |
| Mulaskey | [45] | June 6, 1972 |

[54] PARAFFIN CONVERSION

[72] Inventor: Bernard F. Mulaskey, Fairfax, Calif.

[73] Assignee: Chevron Research Company, San Francisco, Calif.

[22] Filed: Apr. 17, 1970

[21] Appl. No.: 29,701

[52] U.S. Cl. ...................................................260/676
[51] Int. Cl. .......................................................C07c 9/00
[58] Field of Search.........................260/676, 683 D, 673.5; 208/138

[56] References Cited

UNITED STATES PATENTS

| 3,247,099 | 4/1966 | Oleck | 208/138 |
| 3,369,997 | 2/1968 | Hayes et al. | 208/139 |
| 3,511,773 | 5/1970 | Addison et al. | 208/139 |
| 3,544,648 | 12/1970 | Wilson et al. | 260/683 D |
| 3,546,314 | 12/1970 | Larson | 260/683 D |
| 3,446,868 | 5/1969 | Box | 260/676 |
| 3,484,499 | 12/1969 | Lester et al. | 260/673 |
| 3,294,858 | 12/1966 | Butler et al. | 260/683 |
| 3,437,586 | 4/1969 | Weisz | 208/210 |
| 3,432,568 | 3/1969 | Miale et al. | 260/676 |
| 3,437,709 | 4/1969 | Chloupek | 260/672 |
| 3,476,821 | 11/1969 | Brandenburg | 260/672 |

*Primary Examiner*—Delbert E. Gantz
*Assistant Examiner*—J. M. Nelson
*Attorney*—A. L. Snow, F. E. Johnston, G. F. Magdeburger, C. J. Tonkin and T. G. De Jonghe

[57] ABSTRACT

A process for disproportionating feed light alkane to obtain higher molecular weight hydrocarbons which comprises contacting the feed light alkane, at elevated temperature and pressure, with a catalyst comprising a molecular sieve composited with a Group VIII noble metal. Preferably the contacting is carried out in the presence of $H_2O$.

8 Claims, No Drawings

PARAFFIN CONVERSION

BACKGROUND OF THE INVENTION

1. Field of the Invention

The present invention relates to the conversion of alkane hydrocarbon feeds to hydrocarbon products with different distributions of molecular weights than those of the feeds. More particularly, the present invention relates to the disproportionation of alkane hydrocarbons, in the presence of $H_2O$, using a catalyst comprising a molecular sieve composited with a Group VIII noble metal.

The term "disproportionation" is used herein to mean the conversion of hydrocarbons to new hydrocarbons of both higher and lower molecular weight. For example, propane may be disproportionated according to the reaction:

$$C_3H_8 \rightarrow C_2H_6 + C_4H_{10}$$

2. Prior Art

A number of processes have been disclosed for converting various hydrocarbons to higher molecular weight hydrocarbons. For example, polymerization has been proposed for increasing the molecular weight of hydrocarbons such as gaseous, or low-boiling olefins. Various processes for olefin polymerization have been disclosed, including processes wherein the polymerization reaction is catalyzed with inorganic acids such as sulfuric or phosphoric.

To obtain the olefinic feed for a polymerization reaction, both thermal cracking and catalytic dehydrogenation processes have been proposed. For example, a two-stage process has been proposed wherein hydrocarbon gases are first cracked to form substantial amounts of olefins. Then the olefins are polymerized to higher-boiling compounds by contacting the olefins with a catalyst adapted to promote the forming of heavier hydrocarbons by polymerization.

U.S. Pat. No. 1,687,890 is directed to a process of converting low-boiling point hydrocarbons into higher-boiling point hydrocarbons by mixing a hydrocarbon vapor with steam and then contacting the steam-hydrocarbon mixture with iron oxide at temperatures in excess of 1,112° F. It is theorized in U.S. Pat. No. 1,687,890 that the following reactions may be involved to a greater or lesser extent:

"1. Paraffin hydrocarbons on being brought into contact with ferric oxide at elevated temperatures are oxidized or dehydrogenated, forming unsaturated hydrocarbons.
2. Unsaturated hydrocarbons of low molecular weight polymerize into unsaturated hydrocarbons of higher molecular weight when subjected to elevated temperatures, the extent of polymerization depending upon the temperature and duration of treatment.
3. Ethylene and other gaseous hydrocarbons, including methane, react with ferric oxide at temperatures of from 500° to 550° C. forming ferrous oxide, water and carbon.
4. Carbon reduces ferric oxide to ferrous oxide at temperatures of from 550° to 600° C. with production of carbon monoxide.
5. Carbon monoxide reduces ferric oxide to ferrous oxide at temperatures of from 550° to 600° C. with formation of carbon dioxide.
6. Water vapor reacts with ferrous oxide at about 600° C. forming ferric oxide and highly reactive or so-called "-nascent" hydrogen.
7. Unsaturated hydrocarbons are hydrogenated by nascent hydrogen."

Another process which has been proposed for converting hydrocarbons to higher molecular weight hydrocarbons is olefin disproportionation. Numerous methods and catalysts have been disclosed for the disproportionation of olefins. In most of these processes, the olefin is disproportionated by contacting with a catalyst such as tungsten oxide or molybdenum oxide on silica or alumina at a temperature between about 150° and 1,110° F. and at a pressure between about 15 and 1,500 psig. These prior art processes have been directed to an effective method to convert essentially only olefins, not alkane hydrocarbons, to higher molecular weight hydrocarbons by disproportionation.

For example, in U.S. Pat. No. 3,431,316, an olefin disproportionation process is disclosed, and it is stated that, if desired, paraffinic and cycloparaffinic hydrocarbons having up to 12 carbon atoms per molecule can be employed as diluents for the reaction; that is, the alkane hydrocarbons are nonreactive and merely dilute the olefins which are the reactants.

A process for the direct conversion of alkane hydrocarbons to higher molecular weight hydrocarbons would be very attractive because in many instances alkane hydrocarbons are available as a relatively cheap feedstock. For example, in many instances, excess amounts of propane and/or butanes are available in an overall refinery operation.

Processes which have been previously reported wherein alkane hydrocarbons are disproportionated include contact of alkane hydrocarbons with solid catalyst comprised of $AlCl_3$ on $Al_2O_3$ and contact of alkane hydrocarbons with a promoter comprised of alkyl fluoride and $BF_3$. The use of the $AlCl_3$ solid catalyst was uneconomic because, among other reasons, the catalyst was nonregenerable. The use of the alkyl fluoride and $BF_3$ was unattractive because of severe corrosion, sludge formation and other operating problems.

In the past it has been the practice to convert alkane hydrocarbons, particularly normal alkanes, to olefins as a separate or distinct step and then to disproportionate the olefins to valuable higher molecular weight hydrocarbons.

For example, in U.S. Pat. No. 3,431,316, saturated light hydrocarbons are cracked to form olefins, and then the olefins are separated from the cracker effluent and fed to a disproportionation zone wherein the olefins are disproportionated to higher molecular weight hydrocarbons. Thus, a separate step is used to obtain olefins, because, according to the prior art, no economically feasible process is available for the direct disproportionation of alkane hydrocarbons.

U.S. Pat. No. 3,445,541 discloses a process for the dehydrogenation-disproportionation of olefins and paraffins using a combined dehydrogenation and disproportionation catalyst. According to U.S. Pat. No. 3,445,541, a hydrocarbon feed which is either an acyclic paraffin or acyclic olefin having three to six carbon atoms is contacted with the catalyst at conditions of temperature and pressure to promote dehydrogenation and disproportionation.

In the process disclosed in U.S. Pat. No. 3,445,541, the disproportionation reaction is carried out using a catalyst which contains a known olefin disproportionation component such as tungsten oxide or molybdenum oxide. Group VIII noble metals are not conventional olefin disproportionation components.

Numerous patents, including U.S. Pat. Nos. 3,437,709, 3,476,821 and 3,281,483, have disclosed disproportionation using a crystalline aluminosilicate molecular sieve (molecular sieve) catalyst, such as mordenite. However, these prior art disclosures involve disproportionation of alkyl aromatics such as toluene, not disproportionation of alkanes.

U.S. Pat. No. 3,175,967 discloses at column 12, line 64, that $H_2O$ brings about the deactivation of a molecular sieve catalyst used, for example, in cracking reactions. U.S. Pat. No. 3,437,709 discloses that in the disproportionation of alkyl aromatics small amounts of oxygen supplying materials, preferably air or oxygen, act to increase the disproportionation of methyl-substituted aromatic compounds. Oxygen supplying materials other than the preferred air listed in U.S. Pat. No. 3,437,709 are oxygen, $CO_2$, t-butanol, water, phenol, benzoic acid, benzyl alcohol, and benzaldehyde. As mentioned above, U.S. Pat. No. 3,437,709 relates to disproportionation of the alkyl aromatics and not to disproportionation of alkanes.

SUMMARY OF THE INVENTION

According to the present invention, a process is provided for disproportionating feed light alkanes to obtain higher molecular weight hydrocarbons which comprises contacting a light alkane, at elevated temperature and pressure, with a catalyst comprising a molecular sieve composited with a Group VIII noble metal.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties and the like. The term "molecular sieves," is derived from the ability of these zeolite materials to selectively absorb molecules on the basis of their size and form. The various types of molecular sieves may be classified according to the size of the molecules which will be rejected (i.e., not adsorbed) by a particular sieve. U.S. Pat. Nos. 3,013,982–86 describe a number of these synthetic zeolites, designated therein as Zeolite A, D, L, R, S, T, X and Y. In addition to their extensive use as adsorbents for hydrocarbon separation processes and the like, it has recently been found that crystalline aluminosilicate zeolites, particularly after cation exchange to reduce alkali metal oxide content, are valuable catalytic materials for various processes, particularly hydrocarbon conversion processes.

In general, the chemical formula of the anhydrous crystalline aluminosilicate zeolites expressed in terms of moles may be represented as:

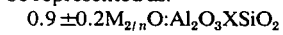

$0.9 \pm 0.2 M_{2/n} O : Al_2O_3 X SiO_2$ wherein M is selected from the group consisting of hydrogen, monovalent and divalent metal cations and mixtures thereof; n is its valence, and X is a number from about 1.5 to about 12, said value being dependent upon the particular type of zeolite. The zeolite as produced or found naturally normally contains an alkali metal such as sodium or an alkaline earth metal such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica to alumina ratios depending upon such variables as composition of the crystallization mixture, reaction conditions, etc. For the synthetic faujasite type, X in the above formula has a value of from about 2 to about 7, preferably 5.0 to 5.5; for the synthetic mordenite type, X has the value of from about 8 to about 12, preferably, 9.5 to 10.5; and for the "Zeolite A" type, X has a value of about 1.5 to about 5, preferably 1.9 to 3.

In the process of the present invention, the catalyst comprises a molecular sieve composited with a Group VIII noble metal and it is particularly preferred to use mordenite as the specific molecular sieve portion of the catalyst. The noble metals which are used together with the molecular sieve portion of the catalyst are Group VIII noble metals, sometimes referred to as the platinum group noble metals, and specifically including palladium, platinum, rhodium, ruthenium, osmium and iridium. Particularly good results have been achieved in accordance with the process of the present invention using palladium, and a particularly preferred catalyst composite for use in the process of the present invention is palladium composited with mordenite.

It is preferred to carry out the contacting of the feed light alkane with the catalyst at a pressure between 50 and 4,500 psig and a temperature between 700° and 1,750° F. In the process of the present invention, it is particularly preferred to carry out the contacting of the feed light hydrocarbons with the catalyst at a temperature between 950° and 1,350° F.

The present invention is directed to the disproportionation of light alkanes, i.e., saturated or paraffinic hydrocarbons which boil at a relatively low temperature such as propane, butanes, pentanes, and hexanes. Particularly preferred light hydrocarbons feedstocks are propane, isobutane and normal butane. The process of the present invention has been found to give particularly advantageous results in terms of production of more valuable hydrocarbons when the process of the present invention is used to disproportionate a hydrocarbon feedstock composed mostly of propane. The term "mostly" is used to connote that the propane feedstock is at least 50 percent propane. Preferably, the propane feedstock is at least 80–90 percent propane.

The process of the present invention can be carried out in the presence of $H_2O$ or substantially in the absence of $H_2O$. However, it is preferred to have at least minor amounts of $H_2O$ present during the contacting of the hydrocarbon feed with the catalyst. Because of the elevated temperature employed in the process of the present invention, usually $H_2O$ will be present in the form of steam. Preferably $H_2O$ is added to or mixed with the feed light alkanes immediately before the light alkanes are contacted with the molecular sieve Group VIII noble metal catalyst. It is preferred to use about 0.2 to 80 and more preferably 1.0 to 50 volume percent $H_2O$ based on the total volumetric amount of the $H_2O$ and light alkanes fed to the contacting step in the process of the present invention. The volumetric amounts of light alkanes and $H_2O$ is based on volumes calculated for these constituents at 60° F. and normal atmospheric pressure.

In the process of the present invention, it is believed that the $H_2O$ serves to reduce catalyst fouling and increase the yield of higher molecular weight hydrocarbons. It is not known exactly how the $H_2O$ functions in the process of the present invention, but we have obtained decreased fouling and plugging of small lines in laboratory equipment when using $H_2O$ together with the alkane feed to the high temperature reactor, and surprisingly good yields of higher molecular weight hydrocarbons have been obtained in the laboratory when using $H_2O$ with the feed to the high temperature catalytic reaction.

More narrow preferred operating conditions for the process of the present invention include a temperature between 1,000° and 1,300° F. and a pressure between 1,000 and 3,000 psig. Two particularly preferred catalysts for use in the process of the present invention are palladium on mordenite and platinum on mordenite.

DETAILED DESCRIPTION

In accordance with a very preferred embodiment of the present invention, a propane feedstock is disproportionated by contacting the propane, in the presence of at least 0.5 volume percent $H_2O$ and at a temperature of about 1,070° to 1,190° F. and a pressure of about 750 to 300 psig, with a catalyst comprising palladium on mordenite. Preferably the LHSV is between 1.0 and 9.0, based on the combined volumetric feed rate of $H_2O$ and propane.

In one specific run (Run A) using the process of the present invention, propane was disproportionated to form higher and lower molecular weight hydrocarbons. The operating conditions for Run A were as follows:

| Feed: | 50/50 volume percent mixture of propane and $H_2O$ |
|---|---|
| Catalyst: | 2 percent palladium impregnated onto mordenite. |
| Temperature: | 1,132°F. |
| Pressure: | 1,500 psig |
| Liquid Hourly Space Velocity (LHSV) (Volume of propane + $H_2O$ measured at 60°F. per hour per volume of catalyst): | 8.0 |

A yield of over 11 weight percent $C_5 +$ hydrocarbons was obtained from the run at the conditions as specified above. Thus, a very substantial amount of heavy hydrocarbons are produced by disproportionating propane in a process in accordance with the present invention. Table I below further summarizes the results obtained from Run A at the conditions specified above and also tabulates data on two further runs, B and C.

TABLE I

| Run | Weight percent yields | | | |
|---|---|---|---|---|
| | A | B | C | D |
| Compound: | | | | |
| CH₄ | 14.24 | 14.1 | 21.3 | 16.5 |
| Ethene | 4.94 | 8.0 | 5.4 | 2.3 |
| Ethane | 10.68 | 8.0 | 19.9 | 8.5 |
| Propane [1] | 55.46 | 64.0 | 58.6 | 60.1 |
| Isobutane | 0.47 | | | 1.3 |
| Isobutene | 1.13 | | | 1.2 |
| N-Butane | 1.28 | | | 1.3 |
| N-Butenes | 0.76 | | | 0.3 |
| C₅⁺ | 11.03 | 13.0 | 14.5 | 8.5 |
| Aromatics in C₅⁺ | 3.63 | | 6.4 | 2.9 |
| Ultimate yield of "useful" material [2] | 38.6 | 37.1 | 23.6 | 37.4 |
| Temp., °F | 1,132 | 1,130 | 1,144 | 1,018 |
| LHSV (propane) | 4.0 | 4.0 | 4.0 | 4.0 |
| LHSV H₂O | 4.0 | 4.0 | 4.0 | 0 |
| LHSV total | 8.0 | 8.0 | 8.0 | 4.0 |

[1] Probably some propylene in the propane. propylene was not split out on chromatograph used to analyze the product.
[2] Ethene plus butenes plus C₅⁺×100=ultimate yield propano conversion.

It can be seen from Table I that temperatures in the vicinity of 1,000°– 1,300° F. and preferably temperatures above 1,100° F. should give attractive yields of higher molecular weight hydrocarbons in a process in accordance with the present invention. Particularly, temperatures in the range of about 1,100°– 1,160° F. give attractive yields of valuable hydrocarbons by a disproportionation process in accordance with the present invention.

Although various embodiments of the invention have been described, it is to be understood that they are meant to be illustrative only and not limiting. Certain features may be changed without departing from the spirit or scope of the invention. It is apparent that the present invention has broad application to the disproportionation of light alkanes in the presence of H₂O using a catalyst comprising a molecular sieve and a Group VIII noble metal. Accordingly, the invention is not to be construed as limited to the specific embodiments or examples discussed but only as defined in the appended claims.

I claim:

1. A process for disproportionating feed light alkanes selected from the group consisting of propane, normal-butane and isobutane and mixtures thereof, which comprises contacting the light alkane, in a reaction zone, at a temperature between 1,000° and 1,300° F., with a catalyst comprising a molecular sieve composited with a metal selected from the group consisting of palladium, platinum, rhodium, ruthenium, osmium and iridium.

2. A process in accordance with claim 1 wherein the contacting is carried out at a temperature between 1,100° and 1,300° F.

3. A process in accordance with claim 1 wherein the molecular sieve is mordenite.

4. A process in accordance with claim 1 wherein the catalyst comprises a molecular sieve composited with palladium or platinum.

5. A process in accordance with claim 1 wherein the reaction is carried out in the presence of H₂O.

6. A process in accordance with claim 1 wherein 0.5 to 50 volume percent H₂O, based on the volume of light alkane feed, is fed to the reaction zone.

7. A process in accordance with claim 1 wherein the catalyst comprises palladium on mordenite.

8. A process for disproportionating propane to obtain higher molecular weight hydrocarbons, selected from the group consisting of alkane, olefin, and aromatics or aromatic mixtures thereof which comprises contacting the propane, in the presence of about 0.5 to 50 volume percent H₂O and at a temperature of about 1,070° to 1,190° F. and a pressure of about 50 to 4,500 psig, with a catalyst comprising palladium on mordenite.

* * * * *